US 8,326,957 B2

(12) United States Patent
Igarashi

(10) Patent No.: US 8,326,957 B2
(45) Date of Patent: Dec. 4, 2012

(54) INFORMATION PROCESSING APPARATUS AND DEVICE MANAGEMENT METHOD

(75) Inventor: Toshiaki Igarashi, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 1309 days.

(21) Appl. No.: 11/675,000

(22) Filed: Feb. 14, 2007

(65) Prior Publication Data
US 2007/0201080 A1 Aug. 30, 2007

(30) Foreign Application Priority Data

Feb. 28, 2006 (JP) ................................. 2006-053344

(51) Int. Cl.
*G06F 15/173* (2006.01)
(52) U.S. Cl. ........ 709/223; 709/209; 713/323; 358/1.15
(58) Field of Classification Search .................. 709/208, 709/209, 223; 713/300, 323; 358/1.15
See application file for complete search history.

(56) References Cited

U.S. PATENT DOCUMENTS

| 7,406,611 | B2 * | 7/2008 | Takahashi et al. ............ 713/300 |
| 7,433,317 | B2 * | 10/2008 | Kobayashi et al. ........... 370/241 |
| 2002/0026492 | A1 * | 2/2002 | Fujita ............................ 709/208 |
| 2002/0044295 | A1 * | 4/2002 | Tanaka .......................... 358/1.13 |
| 2005/0125702 | A1 * | 6/2005 | Huang et al. .................. 713/320 |
| 2005/0251411 | A1 * | 11/2005 | Ishii et al. ......................... 705/1 |
| 2006/0179213 | A1 * | 8/2006 | Brittain et al. ................ 711/105 |
| 2006/0279256 | A1 * | 12/2006 | Bletsas ........................... 320/128 |
| 2009/0164649 | A1 * | 6/2009 | Kawato ......................... 709/229 |

FOREIGN PATENT DOCUMENTS

| JP | 2001-187480 A | 7/2001 |
| JP | 2004-326544 A | 11/2004 |
| JP | 2005-094681 A | 4/2005 |

* cited by examiner

*Primary Examiner* — Oanh Duong
(74) *Attorney, Agent, or Firm* — Canon U.S.A., Inc. IP Division

(57) ABSTRACT

An information processing apparatus communicates with a device connected to a network through a network management application. The information processing apparatus includes a determination unit configured to determine whether an instruction to operate the device is allowed to be issued based on operation priority of the device and status of the device, and a device operation unit configured to issue the instruction to the device in the case where the determination unit determines that the instruction is allowed to be issued.

18 Claims, 15 Drawing Sheets

| COMMAND ID | 0001 | |
|---|---|---|
| COMMAND NAME | DEVICE SETTING | |
| COMMAND CONTENT | DEVICE NAME | BUSINESS PRINTING |
| | INSTALLATION SITE | ROOM A |
| OBJECT DEVICE | DEVICE A, DEVICE B DEVICE C, DEVICE D | |
| NUMBER OF OBJECT DEVICES | N | |
| USER NAME | User1 | |
| EXECUTION SCHEDULE | JAN 1, 3:30am | |
| APPLY RULE | YES | |
| COMMAND POINTS | 8 POINTS | |

| TYPE OF COMMAND | POINTS |
|---|---|
| DEVICE SETTING | 5 |
| DEVICE RESET | 5 |
| RESOURCE DOWNLOAD | 5 |
| DEVICE STATUS MONITORING | 3 |
| DEVICE SEARCH | 1 |

(a) RELATIONSHIP BETWEEN TYPE OF COMMAND AND POINTS

| USER NAME | POINTS |
|---|---|
| User1 | 5 |
| User2 | 5 |
| User3 | 3 |
| User4 | 3 |

(b) RELATIONSHIP BETWEEN USER NAME AND POINTS

COMMAND POINTS = P* (a) POINTS + q* (b) POINTS (c) CALCULATION OF COMMAND POINTS

| DEVICE STATUS | THRESHOLD VALUE |
|---|---|
| SLEEPING | 8 POINTS OR MORE |
| PRINTING | 10 POINTS OR MORE |
| STANDBY | 6 POINTS OR MORE |
| NORMAL | 4 POINTS OR MORE |

(d) RELATIONSHIP BETWEEN DEVICE STATUS AND POINTS

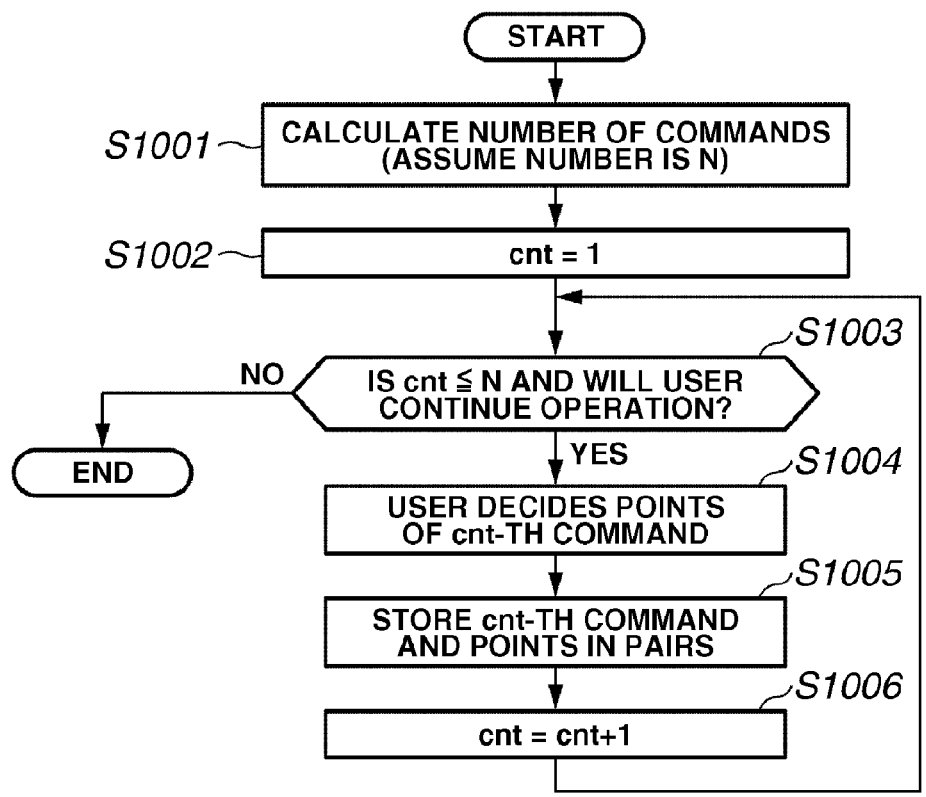

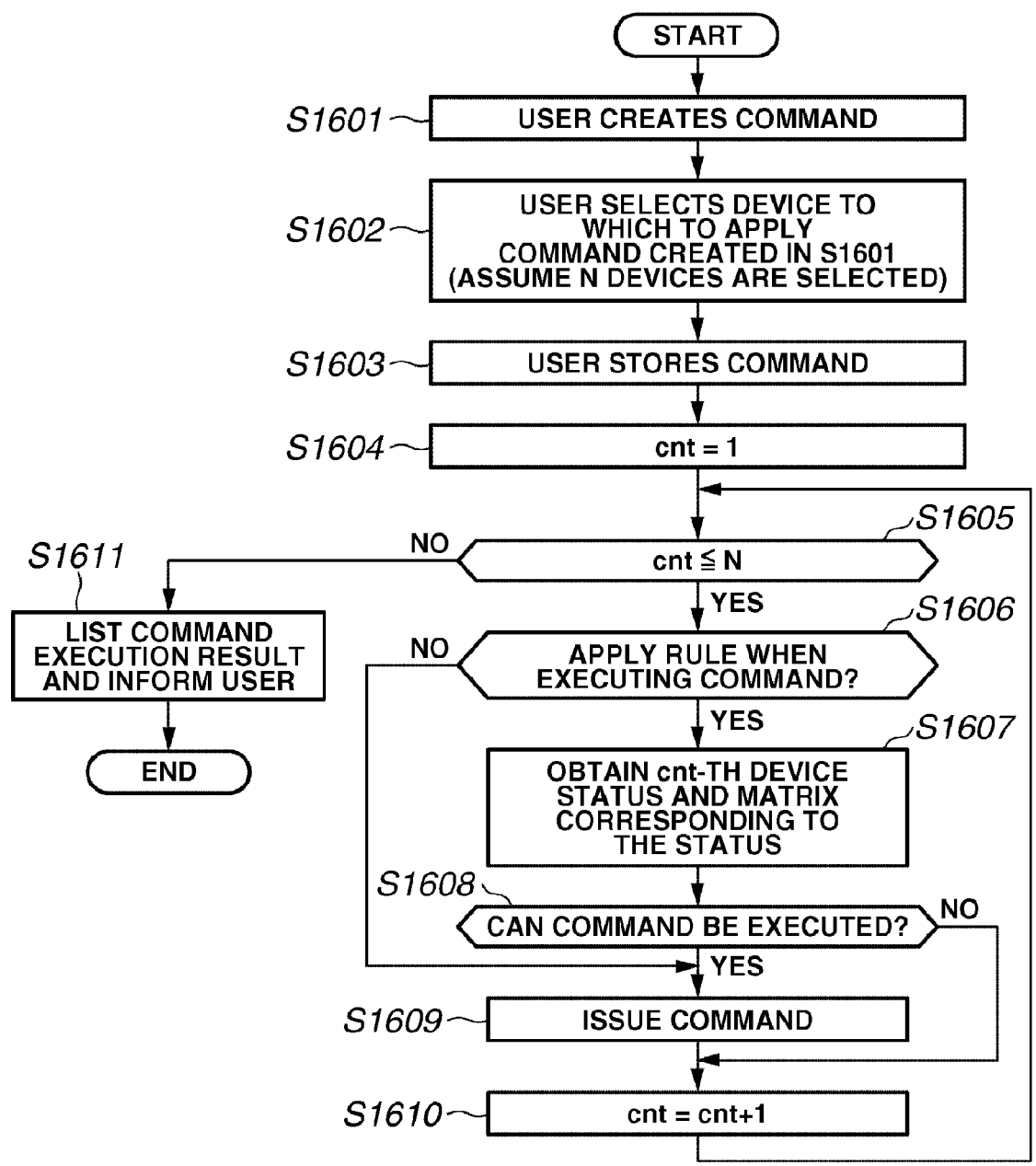

| 1710 | | USER NAME 1730 COMMAND NAME 1720 | User1 | User2 | User3 | User4 |
|---|---|---|---|---|---|---|
| DEVICE STATUS | SLEEPING | DEVICE SETTING | ○ | ○ | × | × |
| | | DEVICE RESET | ○ | ○ | × | × |
| | | RESOURCE DOWNLOAD | ○ | ○ | × | × |
| | | DEVICE STATUS MONITORING | ○ | ○ | × | × |
| | | DEVICE SEARCH | ○ | ○ | × | × |
| | PRINTING | DEVICE SETTING | × | × | × | × |
| | | DEVICE RESET | × | × | × | × |
| | | RESOURCE DOWNLOAD | × | × | × | × |
| | | DEVICE STATUS MONITORING | × | × | × | × |
| | | DEVICE SEARCH | × | × | × | × |
| | STANDBY | DEVICE SETTING | ○ | ○ | × | × |
| | | DEVICE RESET | ○ | ○ | × | × |
| | | RESOURCE DOWNLOAD | ○ | ○ | × | × |
| | | DEVICE STATUS MONITORING | ○ | ○ | ○ | ○ |
| | | DEVICE SEARCH | ○ | ○ | ○ | ○ |
| | ... | | ... | | | |

FIG.18

STORAGE MEDIUM SUCH AS FD OR CD-ROM

| DIRECTORY INFORMATION |
|---|
| PROGRAM CODE CORRESPONDING TO STEPS IN FLOWCHART OF FIG.5 |
| PROGRAM CODE CORRESPONDING TO STEPS IN FLOWCHART OF FIG.10 |
| PROGRAM CODE CORRESPONDING TO STEPS IN FLOWCHART OF FIG.12 |
| PROGRAM CODE CORRESPONDING TO STEPS IN FLOWCHART OF FIG.14 |
| PROGRAM CODE CORRESPONDING TO STEPS IN FLOWCHART OF FIG.16 |
|  |

INFORMATION PROCESSING APPARATUS AND DEVICE MANAGEMENT METHOD

BACKGROUND OF THE INVENTION

1. Field of the Invention

The present invention relates to a process of managing a network device, such as managing an operating state of a device connected to a network.

2. Description of the Related Art

Conventionally, a printing device such as a multifunction peripheral, copying machine, or a printer was often used as a stand-alone device. Consequently, such a device could transition to a low power consumption state when not in use.

More recently, such a printing device is generally connected to a network and receives printing jobs and device control commands from a plurality of personal computers through the network. As a result, such a printing device connected to a network has difficulty in maintaining a low power consumption state as before (hereinafter, a printing device connected to a network will be referred to as a network device).

In particular, a network device management application is required to issue a wide variety of device control commands to a network device on a regular basis. Consequently, such an application often prevents the network device from transitioning to a low power consumption state.

On the contrary, there are market demands for a multifunction peripheral to lower power consumption to 1 watt or less. In addition, there is a strong demand to reduce frequency that a multifunction peripheral returns from a power saving state in a case where an unnecessary packet or instruction is received.

To solve the above problem, Japanese Patent Application Laid-Open No. 2005-094681 discusses a technique in which a sleep frame is sent by broadcast transmission when a network device transitions to a lower power consumption state.

A network device management application receiving the sleep frame recognizes that the network device has transitioned to the lower power consumption state and avoids sending unnecessary frame to the network device. The network device management application sends a boot frame of a network device by broadcast transmission to recover the network device from the lower consumption state.

However, in the above-described network device management system, the network device management application decides on sending a boot frame by broadcast transmission to a network device based on whether the subject device is in a sleep mode. That is, the network device management application does not determine the content of the instruction, such as a priority level. Therefore, a boot frame may be sent to issue a device control command of a low priority based on the independent determination of a user of the network device management application. As a result, the network device may be prevented from transitioning to and/or remaining in a lower power consumption state.

On the contrary, if top priority is given to transitioning to a lower power consumption state, a device control command of high priority cannot be issued to the network device.

SUMMARY OF THE INVENTION

Embodiments of the present invention are directed to an information processing apparatus and a device management method for controlling issuance of a device control command to a device, according to priority of the device control command to be issued by a user. The user controls issuing of such a command, for example, to a device in a lower power consumption state.

According to an aspect of the present invention, an embodiment is directed to an information processing apparatus which is capable of communicating with a device connected to a network through a network management application. The information processing apparatus includes a determination unit configured to determine whether an instruction to operate the device is allowed to be issued, based on operation priority of the device and status of the device, and a device operation unit configured to issue the instruction to the device in a case where the determination unit determines that the instruction is allowed to be issued.

According to another aspect of the present invention, an embodiment is directed to a method in an information processing apparatus which is capable of communicating with a device connected to a network through a network management application. The method includes determining whether an instruction to operate the device is allowed to be issued based on operation priority of the device and status of the device, and issuing the instruction to the device if it is determined that the instruction to operate the device is allowed to be issued.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 illustrates an example of a command format of a device control command stored in a command retaining function shown in FIG. 4.

FIG. 8 describes a point calculation method for each type of command managed by a rule storage function shown in FIG. 4.

FIG. 10 is a flowchart of a data processing procedure in an information processing apparatus according to an exemplary embodiment in the present invention.

FIG. 11 illustrates an example of a specification screen for allocating points to each device control command issued by activating NETMAP shown in FIG. 4.

FIG. 16 is a flowchart of a data processing procedure in an information processing apparatus according to an exemplary embodiment in the present invention.

FIG. 17 illustrates an example of a rule application matrix obtained from a rule storage function shown in FIG. 4.

FIG. 18 illustrates a memory map of a storage medium for storing various data processing programs that can be read by an information processing apparatus according to an exemplary embodiment in the present invention.

DETAILED DESCRIPTION OF THE EMBODIMENTS

Various exemplary embodiments, features, and aspects of the invention will be described in detail below with reference to the drawings.

First Exemplary Embodiment

The first exemplary embodiment of the present invention describes an operation in the case where a network device management application controls issuance of a device control command according to the status of a network device.

Figure 1:
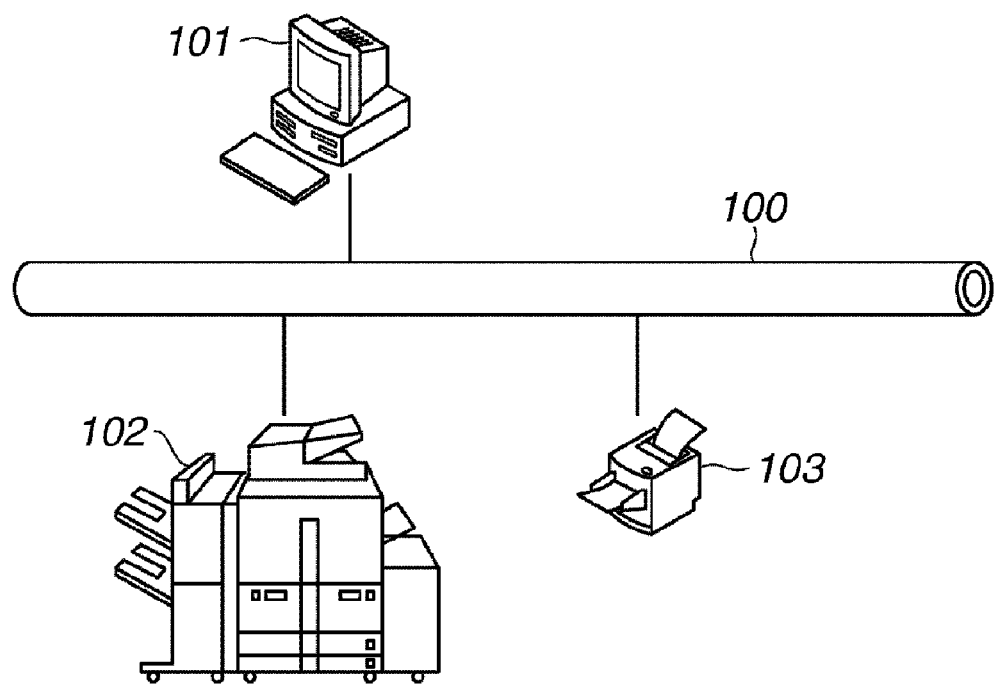
FIG. 1 illustrates a configuration of a network system to which an information processing apparatus according to a first exemplary embodiment in the present invention is applied.

FIG. 1 illustrates a configuration of a network system to which an information processing apparatus according to a first exemplary embodiment in the present invention is applied.

In FIG. 1, a client PC 101 is a device on which a network device management application (NETMAP) runs in the present exemplary embodiment.

A multifunction peripheral 102 is connected to a LAN 100 and has a power saving function which switches a power demand to a power saving mode according to a specific packet receiving state.

A printer 103 is connected to the LAN 100 and has a power saving function which switches a power demand to a power saving mode according to a specific packet receiving state.

The above devices are all connected to a network through the LAN 100. A plurality of devices (not shown) can be connected to the LAN 100 in the present invention. In addition, embodiments of the present invention can be applied to a system environment in which a plurality of devices is connected on another network through a communication control device such as a router.

Figure 2:
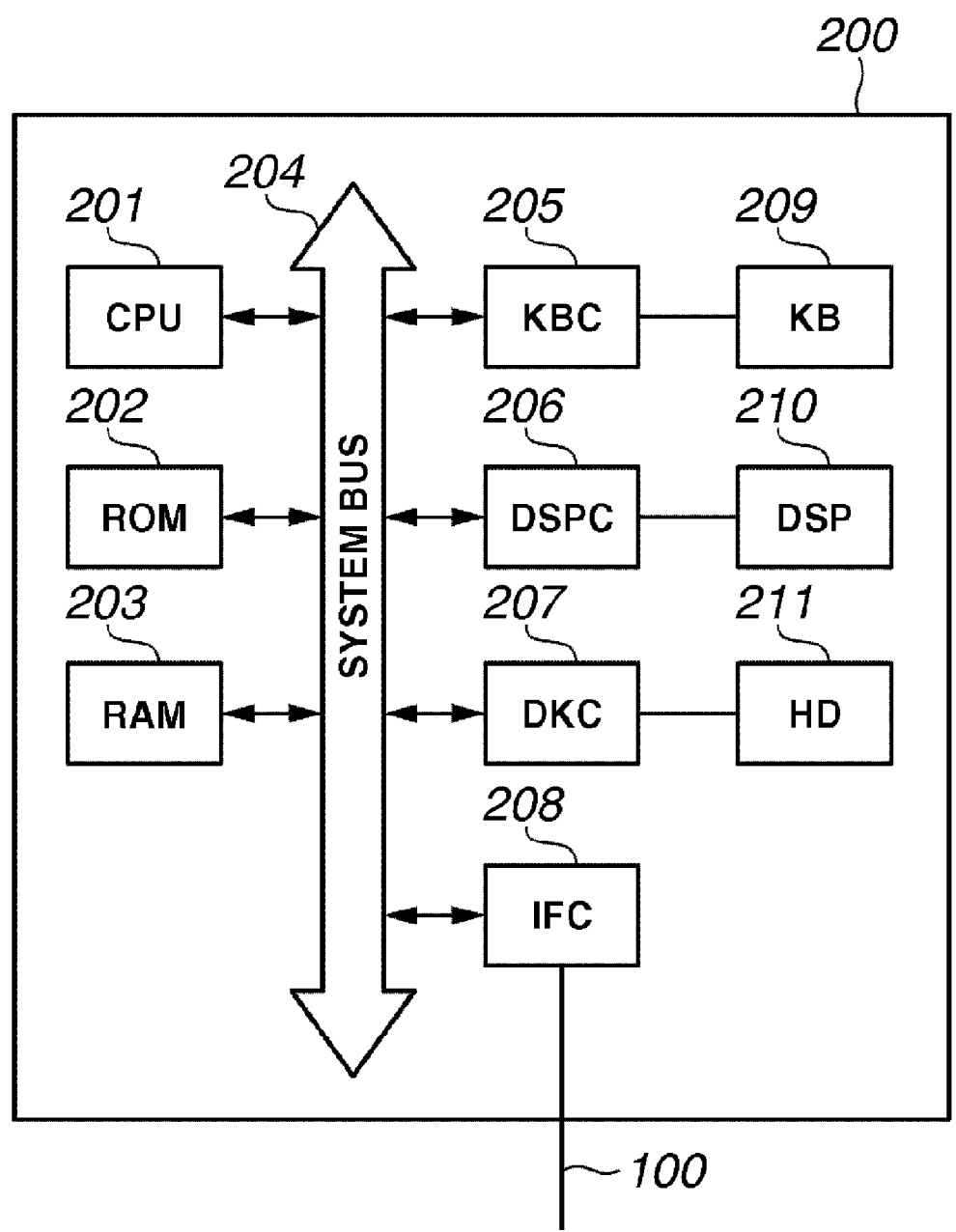
FIG. 2 is a block diagram of an internal configuration of a client personal computer (PC) shown in FIG. 1.

FIG. 2 is a block diagram of an internal configuration of a client PC 101 shown in FIG. 1.

In FIG. 2, a client PC (hereinafter PC) 200 corresponds to the client PC 101 in FIG. 1. A hard disk (HD) 211 and a predetermined operating system (OS) are installed in the PC 200. After the power is switched on, a central processing unit (CPU) 201 loads the OS onto the random access memory (RAM) 203, and loads and executes various system programs (including printer drivers) and application programs. A network device management system (NETMAP) is included in the application program.

The CPU 201 in the PC 200 executes a network device management system program stored in a read-only memory (ROM) 202 or the HD 211. The PC 200 performs overall control of each function block connected to a system bus 204. A NETMAP can also be supplied to the PC 200 by a flexible disk drive (not shown).

The RAM 203 functions as a main memory or as a work area of the CPU 201. A keyboard controller (KBC) 205 controls the command input from a keyboard 209 or a pointing device (not shown). A display controller (DSPC) 206 controls the displaying in a display (DSP) 210.

A disk controller (DKC) 207 controls accessing to a storage device such as a CD-ROM (not shown), HD 211, or a flexible disk controller (not shown). The HD 211 and the flexible disk controller store a boot program, operating system, network device management application, and other applications. An interface controller (IFC) 208 sends and receives information to and from other network devices through the LAN 100.

Figure 3:
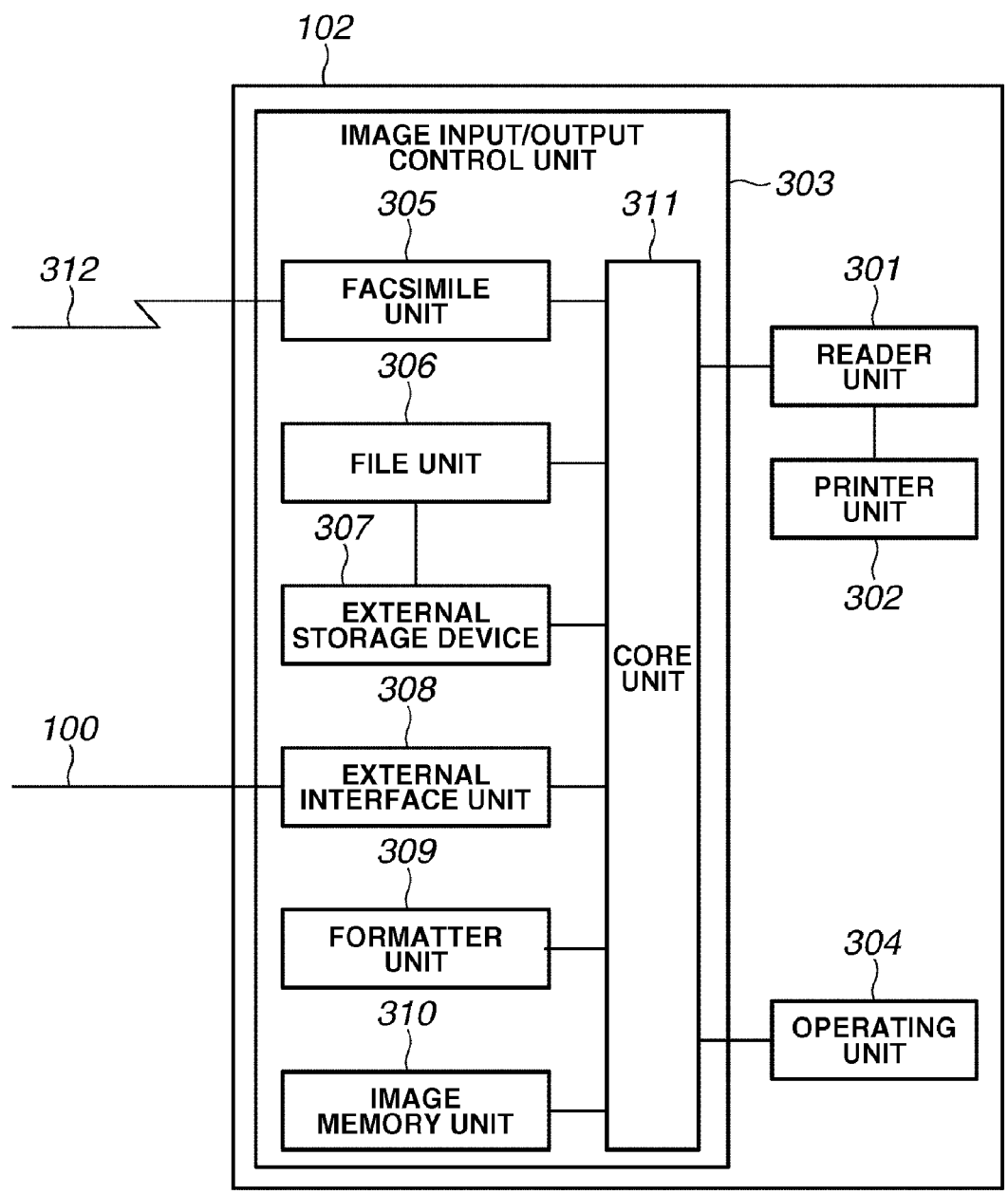
FIG. 3 is a block diagram of an internal configuration of a multifunction peripheral shown in FIG. 1.

FIG. 3 is a block diagram of an internal configuration of a multifunction peripheral shown in FIG. 1.

In FIG. 3, the multifunction peripheral 102 includes a reader unit 301, printer unit 302, and a facsimile unit 305. Thus, the multifunction peripheral 102 is an all-in-one apparatus including a scanner, printer, copying machine, and facsimile machine. In addition, the multifunction peripheral 102 is connected to other communication apparatus through a public line 312. A digital copying machine, a printer having a copy function, or a single-function printer such as the printer 103 can be used in place of a multifunction peripheral as shown in the present exemplary embodiment.

In the present embodiment, a device is not limited to a multifunction peripheral or a printer. The embodiment relates to any device that can shift to a sleep mode to reduce power consumption.

The multifunction peripheral 102 mainly includes the reader unit 301, printer unit 302, image input-output control unit 303, and operating unit 304.

The reader unit 301 is connected to the printer unit 302 and the image input-output control unit 303, and reads an image of an original according to an instruction from the operating unit 304. In addition, the reader unit 301 outputs the read image data onto the printer unit 302 or the image input-output control unit 303.

The printer unit 302 prints the image data output from the reader unit 301 and the image input-output control unit 303 onto a printing paper.

The image input-output control unit 303 is connected to a LAN or a public line, and inputs and outputs image data. In addition, the image input-output control unit 303 analyzes and controls a job. The image input-output control unit 303 includes the facsimile unit 305, a file unit 306, an external interface unit 308, a PDL formatter unit 309, an image memory unit 310, and a core unit 311.

The operation unit 304 receives an input operation from a user.

The facsimile unit 305 is connected to the core unit 311 and the public line. The facsimile unit 305 decompresses compressed image data received from the public line and sends the decompressed data to the core unit 311. Additionally, the facsimile unit 305 compresses image data sent from the core unit 311 and sends the compressed data to a public line network.

The file unit 306 is connected to the core unit 311 and an external storage device 307. The file unit 306 stores image data and an execution result of a device control command sent from the core unit 311 into the external storage device 307. The file unit 306 stores the image data and the execution result together with keywords by which the data and result can be searched. The external storage device 307 can be a hard disk.

In addition, the file unit 306 reads out an image data or an execution result of a device control command stored in the external storage device 307 using a keyword sent from the core unit 311. The read image data and execution result are sent to the core unit 311.

The external interface unit 308 is an interface between other network devices and the core unit 311. Job control data, image data, or device control command are sent to and received from other network devices through the external interface unit 308.

A job control data includes a job control instruction sent together with a PDL data. For example, it is instructed to expand PDL data, and print out the data as image data. Then, stapling and sorting are performed and the printed paper is ejected.

An example of a device control command is a command for changing an operating state of a device, such as changing a network setting or rebooting the multifunction peripheral 102.

The PDL formatter unit 309 is connected to the core unit 311. The PDL formatter unit 309 expands a PDL data sent from a computer into an image data which can be printed by the printer unit 302.

The image memory unit 310 temporarily stores information sent from the reader unit 301 or from a computer through the external interface unit 308.

The core unit 311 controls sending and receiving of data among the reader unit 301, operating unit 304, facsimile unit 305, file unit 306, external interface unit 308, PDL formatter unit 309, and the image memory unit 310 described above.

The core unit 311 performs control of a transition to a sleep mode so that the power consumption of an engine of the printer unit 302 which receives power from a power unit (not shown), is reduced. The transition is made according to a predetermined condition such as a period set by a schedule or a data receiving status.

Figure 4:
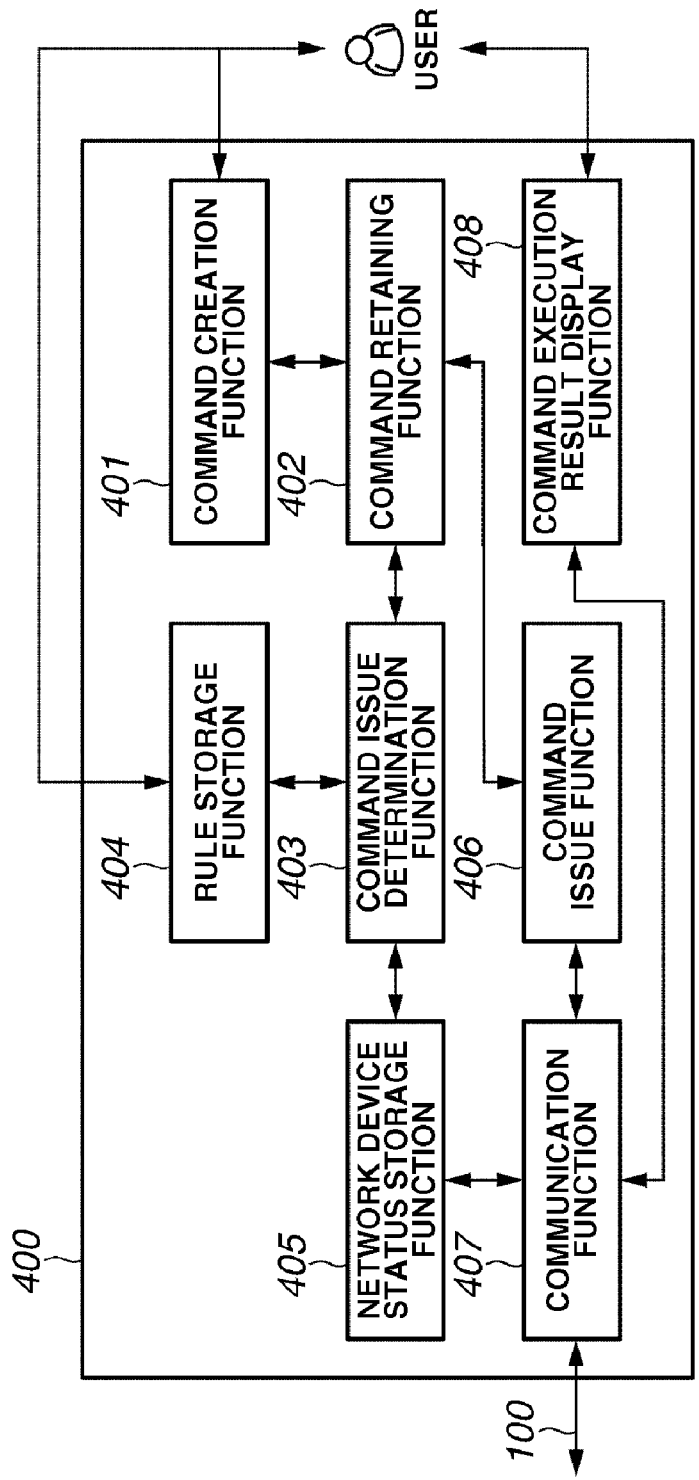
FIG. 4 is a block diagram of an internal configuration of a network device management application in a client PC shown in FIG. 1.

FIG. 4 illustrates a block diagram of a functional configuration of a NETMAP inside the client PC 101 shown in FIG. 1. The present example corresponds to each function of a NETMAP executed by a CPU inside the PC 101. The figure is a configuration example of a function processing unit which controls issuance of a device control command according to the status of a network device.

In FIG. 4, the NETMAP 400 includes a command creation function 401 by which a user creates a device control command, and a command retaining function 402 which stores the created device control command in a memory. The command retaining function 402 is executed on a memory such as a RAM and a hard disk.

A command issue determination function 403 determines whether a device control command can be issued based on a procedure to be described later.

To be more precise, it is determined whether a device control command can be issued is made, using a rule stored in a memory managed by a rule storage function 404, and a status of the network device stored in a memory which is managed by a network device status storage function 405.

The rule storage function 404 stores a rule created by a user in a memory, according to an instruction given through a user interface (UI) screen to be described later. The network device status storage function 405 obtains a status of a network device through a communication function 407. The status of the network device which is obtained in the exemplary system of FIG. 1, is the multifunction peripheral 102. However, it is noted that the status of a different type of network device can be obtained.

In the case where the command issue determination function 403 determines that a device control command can be issued, the device control command is sent to the LAN 100 through a command issue function 406 and the communication function 407. The multifunction peripheral 102 which receives the device control command sent to the LAN 100, executes the command and sends the process result to the client PC 101.

The NETMAP 400 receives the command execution result in the communication function 407. A command execution result displaying function 408 then displays the execution result of the device control command on a display unit of the PC 101 through a predetermined user interface screen.

As described above, the PC 101 can communicate with a device connected to a network through the NETMAP 400 and execute the following functional processing. The PC 101 includes a determination function (corresponding to the command issue determination function 403) for determining whether a command to operate a device such as a multifunction peripheral 102 can be issued. The determination function 403 makes the determination based on determination information varying according to each status of a device, such as operation priority of the device.

In addition, the PC 101 includes a device operation function for issuing an operating instruction to the device in the case where the determination function allows an operation of the device.

Furthermore, the NETMAP 400 includes a first definition function for defining an operation level which sets the importance level of an operation to be performed on the device. The NETMAP 400 also includes a second definition function for defining an authority level of a user performing the operation. The NETMAP 400 determines whether to allow an operation of the device based on the determination information including each of the level values defined by the first and second definition functions.

Figure 5:
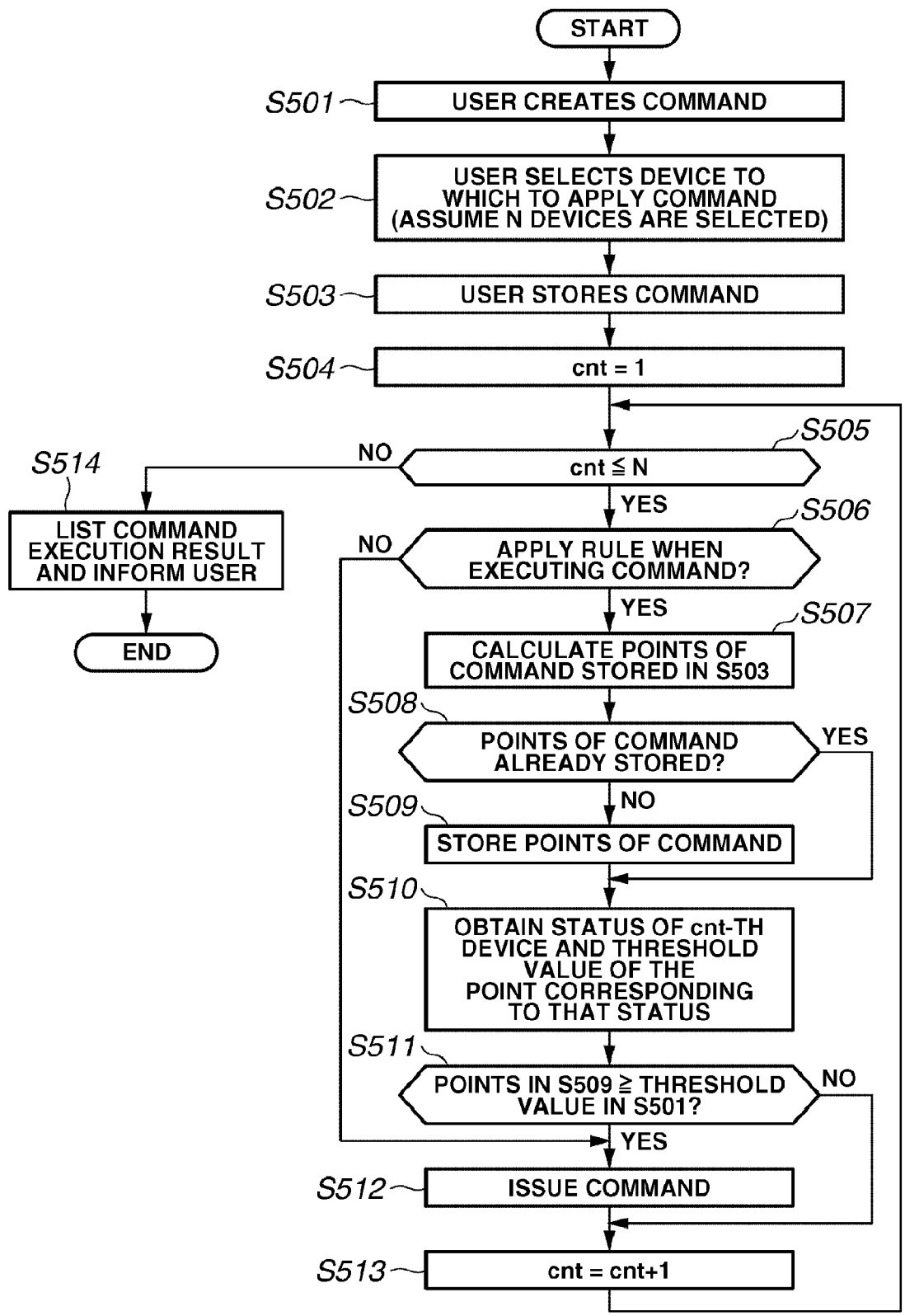
FIG. 5 is a flowchart of a data processing procedure in an information processing apparatus according to an exemplary embodiment in the present invention.

Moreover, the NETMAP 400 executes instructions to display on the display unit to indicate that an operation will be executed when an operating command is to be issued (i.e., in step S514, FIG. 5, execution results of device control commands are listed and displayed to a user).

The NETMAP 400 executes the process of the flowchart shown in FIG. 5 when the NETMAP 400 controls issuance of a device control command according to the status of the multifunction peripheral 102.

FIG. 5 is a flowchart of an example of a data processing procedure in an image processing apparatus according to the present exemplary embodiment. The figure describes an example of a device control command issuing process performed by the PC 101 by activating the NETMAP 400 shown in FIG. 4.

In step S501, a user of the NETMAP 400 creates a device control command. In step S502, the user selects a network device to which the device control command created in step S501 is to be applied. To be more precise, in an embodiment, the command creation function 401 is used to realize the operations of steps S501 and S502. An example of a GUI of this function is shown in FIG. 6.

Figure 6:
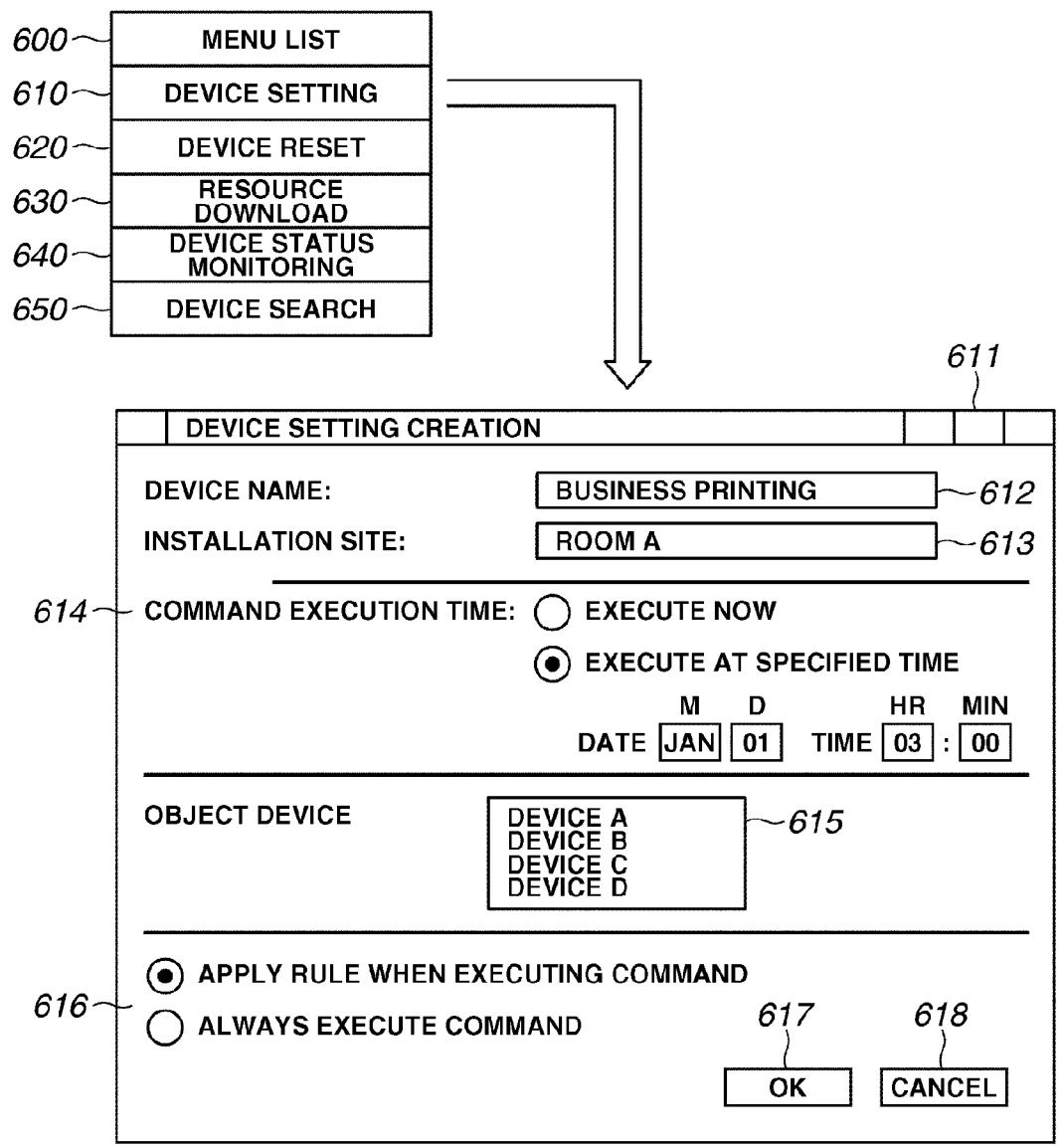
FIG. 6 illustrates an example of a user interface provided by a network device management application (NETMAP) displayed on a display unit of a client PC shown in FIG. 1.

FIG. 6 illustrates an example of a user interface supplied by the NETMAP 400, displayed on a display device of the client PC 101.

In FIG. 6, a menu list 600 is a list of device control commands which can be created by the NETMAP 400. In the present exemplary embodiment, the menu items that can be selected from the menu list 600 are device setting 610, device reset 620, resource download 630 for downloading a resource onto a device, device status monitoring 640, and device search 650.

In the case where a user selects the device setting 610 as a device control command from the menu list 600, a device setting command creation window 611 is displayed.

The command creation window 611 includes a device name input text box (DNBOX) 612 for inputting a nickname of the network device and an installation site input text box 613 for inputting the site where the network device is installed. In addition, the command creation window 611 includes a command execution time specification section 614 for specifying the execution time of the device control command and an object device input text box 615 for specifying the object network device on which the device control command is executed. The object device input text box 615 is configured such that a user can arbitrarily select and set a plurality of devices. Furthermore, the command creation window 611 includes an OK button 617, and a cancel button 618. The rule application radio button 616 is configured to specify whether to apply a rule which will be described later, when executing a device control command.

In the GUI example shown in FIG. 6, a user of the NETMAP 400 sets "business printing" as a value of the DNBOX 612 and "Room A" as a value of the installation site input text box 613 in the creation window 611. In addition, the user sets the command execution time 614 to "execute at specified time" and "January 1, 3 o'clock". Furthermore, the user specifies "Device A", "Device B", "Device C", and "Device D" in the object device input text box 615. Moreover, the user selects "apply rule when executing command" with the rule application radio button 616. Consequently, the present GUI example declares that a rule which will be described later, will be applied when executing a device control command.

After inputting or selecting the above values, the user depresses the OK button 617 by operating a pointing device (not shown) in the PC 101. As a result, a device control command is created by the NETMAP 400 running on a CPU in the client PC 101.

In the case where a user selects "execute now" in the command execution time section 614 and "apply rule when executing command" with the rule application radio button 616, a confirmation dialog box such as "do you really want to execute the device control command?" can be shown.

In step S503, the user stores the device control command created in steps S501 and S502 in a memory (not shown) in the PC 101 using the command retaining function 402.

FIG. 7 illustrates an example of a command format of a device control command stored in a command retaining function shown in FIG. 4.

FIG. 7 shows a case where the value of command ID 710 in a device control command 700 is "0001". The value of command ID 710 can be any value other than "0001" if the value is unique for each device control command.

Command name 720 is one of the names in the menu items listed in the menu list 600. In this example, the command name 720 is "device setting".

Command content 730 stores a content of the device control command. In the present figure, device name 731 and installation site 732 are contents of the device control command 700. Network setting can also be included in the content.

Object device 740 stores information of a network device to which the device control command is sent. In this example, four devices (devices A to D) are set.

Number of object devices 750 stores the number of network devices to which the device control command is sent. In the present device control command, the number of network devices is N. Since four devices (A to D) are set in this example, N becomes 4.

User name 760 stores the name of the user who created the present device control command, or "User1". Execution schedule 770 stores the date and time, "January 1, 3 o'clock", at which time the present device control command will be executed.

Rule application 780 stores information about whether a rule to be described later, will be applied when executing the device control command, or "Yes" in the present case. Command point 790 stores the point "8" of the present device control command calculated according to a rule which will be described later.

In step S504 of the flowchart, the NETMAP 400 initializes a variable cnt as the number of set devices managed by a work memory of the PC 101. Therefore, cnt becomes "1". In step S505, the NETMAP 400 determines whether the variable cnt initialized in step S504 is less than or equal to the number of object devices N (in the present example, "4"). In the case where the variable cnt is determined to be less than or equal to N (YES in step S505), the process proceeds to step S506. In the case where the variable cnt is determined to be greater than N (NO in step S505), the process proceeds to step S514.

In step S506, the NETMAP 400 determines whether to apply a rule which will be described later when executing the device control command stored in the memory in step S503. The present exemplary embodiment uses "YES" and "NO" of the rule application 780 in the determination of the present step. In the case where a rule is to be applied according to the rule application 780 (i.e., "YES" in FIG. 7) (YES in step S506), the process proceeds to step S507. In the case where a rule is not to be applied (i.e., "NO" in FIG. 7) (NO in step S506), the process proceeds to step S512.

In step S507, the NETMAP 400 calculates the points of the device control command stored in step S503. The rule for calculating the points of the device control command will be described using FIG. 8. FIG. 8 describes a point calculation method for each type of command managed by a rule storage function 404 shown in FIG. 4.

In FIG. 8, a rule 800 is stored in a memory managed by the rule storage function 404. FIG. 8A is a table describing the types of device control command shown in FIG. 6 and the corresponding command points (CP). In the present example, 5 points are allocated to "device setting", "device reset", and "resource download" commands, 3 points to "device status monitoring" and 1 point to "device search" command.

FIG. 8B is a table describing the user names and the corresponding points (YP). In the present table, 5 points are allocated to User 1 and User 2, and 3 points are allocated to User 3 and User 4.

FIG. 8C is an example of an equation for calculating a device control command point. In the equation, p and q are weighting coefficients. For the ease of description, p=1 and q=1 are set in the present exemplary embodiment so that the sum of the points shown in FIG. 8A (CP) and the points shown in FIG. 8B (P) is the points of a device control command. However, p and q can be designated any value.

FIG. 8D is a table which sets a threshold value of the points at which a device control command can be issued to each status of a network device. The threshold value of the points is stored in a memory managed by the rule storage function 404 shown in FIG. 4 and is referred to in step S510 which will be described later. The table shows that when a network device is in a sleep mode, only a device control command having 8 or more points can be executed.

In step S508 of the flowchart, the NETMAP 400 determines whether the value of the points of the device control command calculated in step S507 is stored in the command points 790 in the command format 700. In the case where the NETMAP 400 determines that the value is stored (YES in step S508), the process proceeds to step S510. When the NETMAP 400 determines that the value is not stored (NO in step S508), the process proceeds to step S509.

In step S509, the NETMAP 400 stores the points of the device control command calculated in step S507 in the command points 790 in FIG. 7.

In step S510, the NETMAP 400 obtains the status of the cnt-th network device set in the variable cnt stored in the objective device. The obtained status is stored in a memory by the network device status storage function 405, and the threshold value of the points corresponding to the above status is obtained from a memory by the rule storage function 404.

In the present exemplary embodiment, there are several methods for obtaining the status of a network device. In a first method, the NETMAP 400 uses a SNMP protocol and sends a status obtaining command to the network device. In a second method, the network device informs the NETMAP 400 if there is a change in the status.

In step S511, the NETMAP 400 compares the point calculated in step S509 and the point obtained in step S510. The NETMAP 400 then determines whether the point calculated in step S509 is greater than or equal to the point obtained in step S510. When the calculated point is determined to be greater than or equal to the threshold value (YES in step S511), the process proceeds to step S512. On the other hand, when the calculated point is determined to be less than the threshold value (NO in step S511), the process proceeds to step S513.

In step S512, the command issue function 406 issues a device control command retained in the command retaining function 402 to the cnt-th network device set in the variable cnt stored in the object device 740. The device control command is issued by the command issue function 406 through the communication function 407.

In step S513, the variable cnt is increased by "1", and the process returns to step S505. In step S505, if the NETMAP 400 determines that the variable cnt initialized in step S504 is not less than or equal to the number of object devices N (NO in step S505), the list of execution results of the device control command is shown to a user in step S514, and the process ends.

Figure 9:
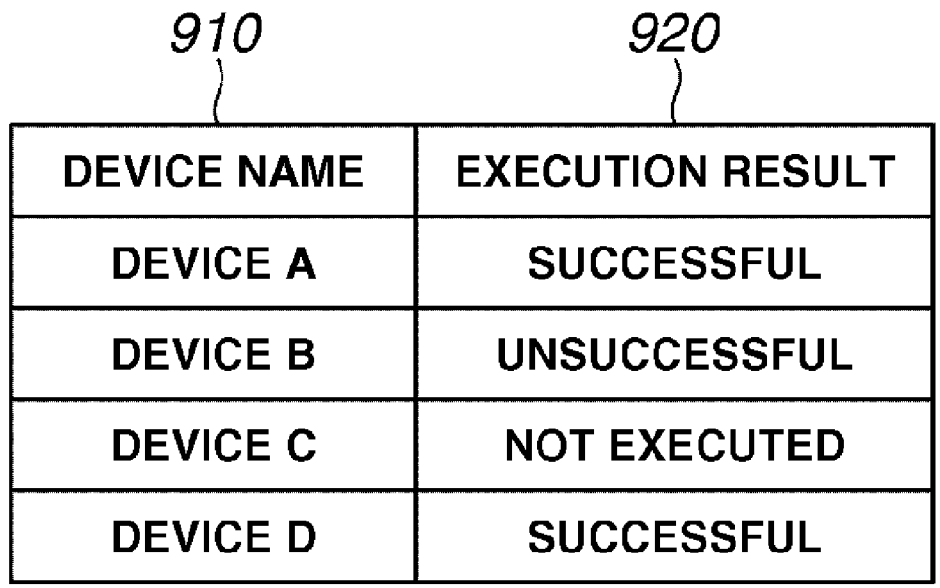
FIG. 9 illustrates a list of execution results of a device control command created by a command creation function shown in FIG. 4.

FIG. 9 illustrates a list of execution results of a device control command created in the command creation function 401 shown in FIG. 4, and in step S514 in FIG. 5.

In FIG. 9, the list of execution results 900 of a device control command consists of a column of device name 910 and of execution result 920. The device name 910 lists the network devices onto which a device control command is executed. The execution result 920 lists the result of executing the device control demand in each network device.

In the present case, if the device control command is successful, "successful" is displayed, and if the execution fails, "unsuccessful" is displayed as an execution result in the present example. The command execution result display function 408 executes the displaying process. In addition to the device name, an installation site of the device can be displayed simultaneously. Furthermore, the execution result can be displayed visually by displaying a network device layout and changing the display of a device according to the execution result.

In the case where it is determined that a device control command is not executed as a result of executing the flowchart of FIG. 5, "not executed" is displayed as an execution result.

The operation will be described below in which a user of the NETMAP 400 creates a rule and stores the rule in the rule storage function 404.

FIG. 10 is a flowchart of an example of a data processing procedure in an information processing apparatus according to the present exemplary embodiment. The process is an example of a process performed by the PC 101 shown in FIG. 1 for allocating points to each device control command by activating the NETMAP 400 shown in FIG. 4. In particular, the process is an example of allocating the points as shown in FIG. 8A.

In step S1001, the NETMAP 400 calculates the number of device control commands listed in the menu list 600. This example assumes that the number of commands is N (i.e., "5" according to FIG. 6 in the present exemplary embodiment).

In step S1002, the NETMAP 400 initializes the variable cnt for counting the number of commands, to "1". In step S1003, the NETMAP 400 determines whether the variable cnt initialized in step S1002 is less than or equal to the number of device control commands N and whether a user will continue the process of the flowchart.

In the case where the NETMAP 400 determines that the variable cnt is less than or equal to the number of device control commands N and that the user will continue the process of the flowchart (YES in step S1003), the process proceeds to step S1004. On the contrary, if the NETMAP 400 determines that the variable cnt is greater than N or that the user will not continue the process of the flowchart (NO in step S1003), the process ends.

In step S1004, the user of the NETMAP 400 decides the points of the cnt-th device control command. In step S1005, the NETMAP 400 stores the decided points in the memory managed by the storage function 404. The points of the device control command are decided relatively in relation with the threshold value of the device status. That is, the points to be set will be different between the case where the device is in a sleep mode and the case where the device is not in a sleep mode. In a sleep mode, the system device is managed not to issue command as long as possible In step S1006, the NETMAP 400 increases the value of the variable cnt by "1" and returns to step S1003.

Thus, the table of the relation between the type of device control command and points shown in FIG. 8A is created. After the table is stored in a memory managed by the rule storage function 404 in step S1005, the process ends.

FIG. 11 illustrates an example of a specification screen for allocating points to each device control command by activating the NETMAP 400 shown in FIG. 4.

In FIG. 11, a command point specification window 1100 includes a command name list box 1101 which displays the device control commands listed in the menu list 600. The operation for listing the device control commands in the command name list box 1101 is realized in step S1001 in FIG. 10.

A user uses a point input text box 1102 to input the points of a device control command displayed in the command name list box 1101. The input operation by the user into the point input text box 1102 is realized in step S1004 in FIG. 10.

An OK button 1103 is used to confirm the operations in the command point specifying window 1100. A cancel button 1104 is used to delete the operations in the command point specifying window 1100.

The value set in the point input text box 1102 can be displayed in the following way so that a user will have a better understanding on the meaning of the set value. That is, the value can be set in the point input text box 1102 for each command together with a guide which displays the relative degree of effect of the command on a device in a sleeping mode.

Figures 12, 13:
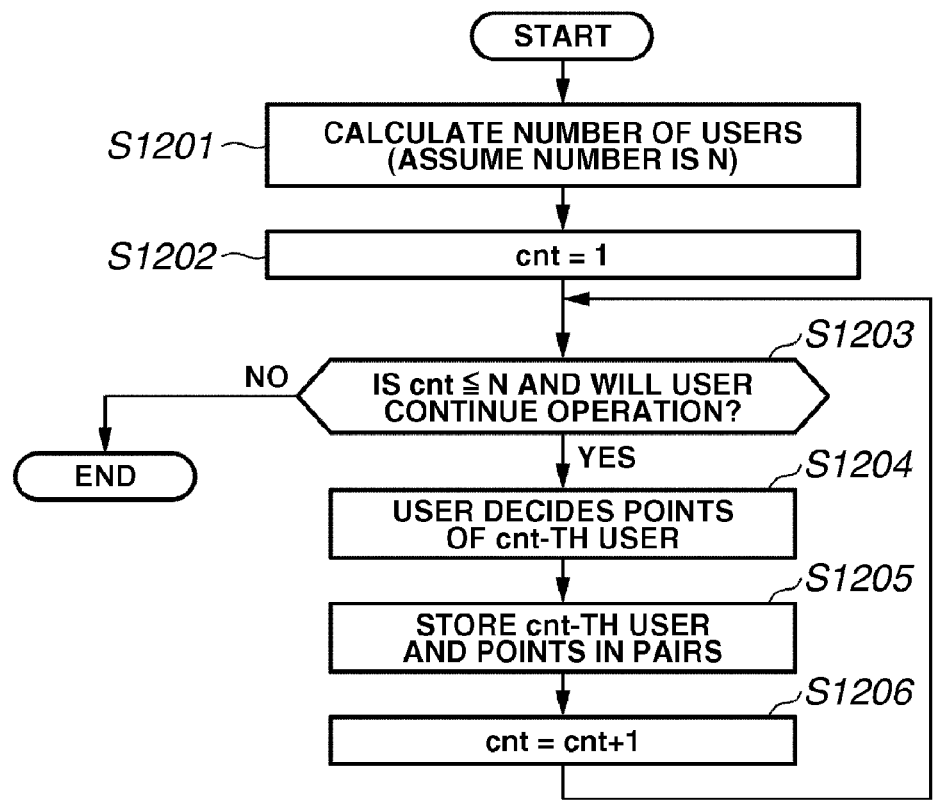
FIG. 12 is a flowchart of a data processing procedure in an information processing apparatus according to an exemplary embodiment in the present invention.
FIG. 13 illustrates an example of a specification screen for allocating points to each user by activating NETMAP.

FIG. 12 is a flowchart of a data processing procedure in an information processing apparatus according to an exemplary embodiment in the present invention. The process is an example performed by the PC 101 shown in FIG. 1 to allocate a point to each user by activating the NETMAP 400 shown in FIG. 4.

FIG. 13 illustrates an example of a specification screen for allocating points to each user by activating the NETMAP 400.

FIG. 12 is different from FIG. 10 only in step S1201 wherein "user" replaces "device control command" in step S1001. In step S1201, the number of users is calculated by referring to the user information of the NETMAP 400. The GUI examples in FIG. 13 and in FIG. 11 differ in a similar way. Therefore, further description on FIG. 12 and FIG. 13 will be omitted.

In the above process, the table describing the relation between a user name and points shown in FIG. 8B is created.

In the present exemplary embodiment, when the value of a user's points is high, it is highly probable that the setting command will be executed even if a rule is applied. Therefore, a user authority to execute a command can be relatively set, the same as a manager's authority.

Figures 14, 15:
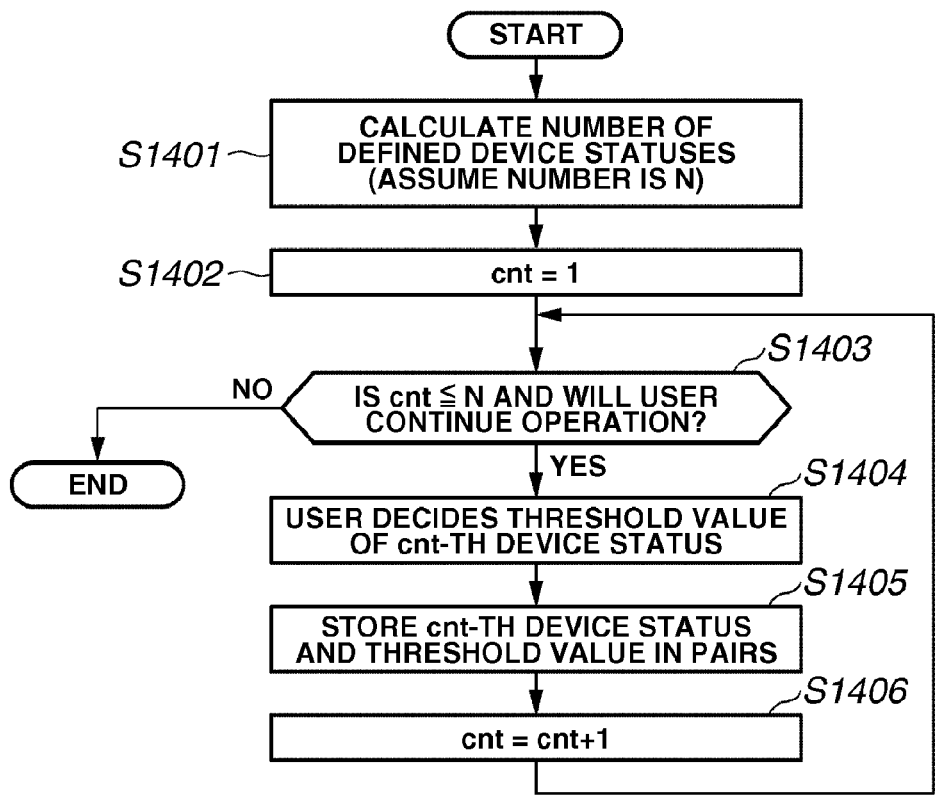
FIG. 14 is a flowchart of a data processing procedure in an information processing apparatus according to an exemplary embodiment in the present invention.
FIG. 15 illustrates an example of a screen for specifying a threshold value at which a device control command can be executed for each status of a network device by activating NETMAP.

FIG. 14 is a flowchart of an example of a data processing procedure in an information processing apparatus according to an exemplary embodiment in the present invention. In the present process, the PC 101 in FIG. 1 allocates a threshold value at which a device control command can be executed, to each network device, by activating the NETMAP 400 shown in FIG. 4.

FIG. 15 illustrates an example of a screen for specifying a threshold value at which a device control command can be executed for each status of a network device, by activating the NETMAP 400 shown in FIG. 4.

FIG. 14 is different from FIG. 10 only in step S1401 in which "network device status" replaces "device control command" in step S1001. In step S1401, the NETMAP 400 calculates a number of defined network device status by referring to defined network device status information. Also, the GUI examples of FIG. 15 and FIG. 11 have the similar relation. Therefore, further description of FIG. 14 and FIG. 15 will be omitted.

In the present exemplary embodiment, if the threshold value at which a command can be executed is high, there is a low probability that the value of the point of the command shown in FIG. 8 will exceed the threshold value of the device. As a result, for example, command setting from a PC can be restricted in a sleep mode.

In the above process, the table of the threshold value is created at which a device control command can be issued to each network device status shown in FIG. 8D.

As described above, in the present exemplary embodiment, the PC 101 can communicate with a device connected to a network (LAN 100) through the NETMAP 400.

The NETMAP 400 running on the PC 101 has a function of creating device control commands of different attributes to issue an operating instruction to a multifunction peripheral 102.

Additionally, the NETMAP 400 includes a function of setting a command issue rule for each different device control command based on operation priority of the device, and the device status.

Furthermore, the NETMAP 400 includes a command issue determination function 403 for determining whether the created device control command can be issued, based on the command issue rule. In the case where the command issue determination function 403 allows the issuing of the command, a command issue function 406 of the NETMAP 400 issues the created device control command to the device.

Moreover, the NETMAP 400 includes a function of displaying a user interface (UI) screen shown in FIG. 6 for a user to specify whether a command issue rule is to be applied. If a user specifies that the command issue rule is to be applied, the command issue determination function 403 determines whether the device control command can be issued.

The command issue function 406 is configured such that a command issue rule for each device control command can be set as shown in FIG. 8. A command issue rule is used to decide on issuing of an instruction to operate a device based on the operation priority, and the status of the device.

To be more precise, the command issue determination function 403 can set a different issue level to the command issue rule for each attribute of a device control command, or for each user issuing a device control command.

Similarly, the command issue determination function 403 can set a threshold value to the command issue rule for deciding whether each device control command can be issued. The command issue rule calculates a desired value. The command issue rule is different in each attribute of a device control command or in each user issuing a device control command. In the case where the calculated desired value exceeds the threshold value (i.e., "YES" in step S511 of FIG. 5), the command issue determination function 403 determines that a device control command can be issued.

Furthermore, the NETMAP 400 can set an issue level of user authority that determines importance of a device control command, or an issue level of each device control command that determines importance of a device control command.

In addition, the command issue function 406 sends an issue confirmation to a user when issuing the device control command.

The command execution result display function 408 obtains an issue result of the command issue function 406 from the device and displays the result list on the display unit.

The rule storage function 404 stores in a memory, the command issue rule set for each device control command.

Accordingly, even in the case of a single device control command, a user can perform control to switch between a case where a created device control command is issued and a case where not issued. The control is performed based on the status of the network device and an issuance rule set by a user. Therefore, a user has full command in creating a command execution environment adapted to the device status. In addition, a device in a sleep mode can be forcibly shifted to an operable status. Furthermore, in a sleep mode, the execution status can be changed for each device control command which has a different attribute.

Second Exemplary Embodiment

In the second exemplary embodiment, the NETMAP 400 controls issuance of a device control command solely depending on the status of the network device and the type of device control command.

To realize the above embodiment, the points of the device control command are calculated (FIG. 5, step S507) using only the table of the relationship between the type of device control command and points shown in FIG. 8A, and the table setting the threshold of the points at which a device control command is issued to each network device status shown in FIG. 8D. That is, p=1 and q=0 are designated in the equation for calculating the device control command points shown in FIG. 8C, instead of p=1 and q=1 as in the first exemplary embodiment.

Third Exemplary Embodiment

In the third exemplary embodiment, the NETMAP 400 controls issuance of the device control command solely depending on the network device status and the user name.

To realize the above embodiment, the points of the device control command are calculated (FIG. 5, step S507) using only the table of the relationship between the user name and points shown in FIG. 8B, and the table setting the threshold of the points at which a device control command is issued to each network device status shown in FIG. 8D. That is, p=0 and q=1 are designated in the equation for calculating the device control command points shown in FIG. 8C, instead of p=1 and q=1 as in the first exemplary embodiment.

Fourth Exemplary Embodiment

In the fourth exemplary embodiment, the NETMAP 400 controls issuance of the device control command based on a matrix created for each status of a network device instead of using the equation for calculating the device control command points shown in FIG. 8C.

FIG. 16 is a flowchart of a data processing in an information processing apparatus according to an exemplary embodiment in the present invention. The present process is an example of a second issue process of a device control command performed by the PC 101 shown in FIG. 1 by activating the NETMAP 400 in FIG. 4. Since steps S1601 to S1606 are the same as steps S501 to S506 in FIG. 5, description of these steps will be omitted.

In step S1607, the NETMAP 400 obtains the status of the cnt-th network device stored in object device 740 of the command format 700 shown in FIG. 7 and stores the status in a memory using the network device status storage function 405. In addition, the NETMAP 400 obtains a rule application matrix (to be described later) corresponding to the status of the network device from the rule storage function 404.

In step S1608, the NETMAP 400 determines whether a device control command can be issued using the rule application matrix obtained in the previous step.

Since steps S1609 to S1611 that follow are the same as steps S512 to S514 in FIG. 5, description on these steps are omitted.

The rule application matrix used in step S1608 will be described using FIG. 17. FIG. 17 illustrates an example of a rule application matrix obtained from the rule storage function shown in FIG. 4.

In FIG. 17, the device status 1710 and the command name 1720 are listed in the rule application matrix 1700. The device status 1710 lists the status (e.g., idling, printing, sleeping, and jam clearing) of a network device. The command name 1720 lists the titles of the menu items listed in the menu list 600 (in the present embodiment, 5 examples as in FIG. 6.). User name 1730 lists the user names registered in the NETMAP 400 (in the present exemplary embodiment, 4 names as in FIG. 8). In FIG. 17, "o" indicates a user who can issue a certain command to a device in a certain status.

To be more precise, in the case where the device status 1710 is "sleeping", user 1 and user 2 are authorized to issue a device set command and a device reset command. However, user 3 and user 4 are not authorized to issue these commands.

In the present exemplary embodiment, when the device is idling instead of operating in a lower-power consumption state, the determination function determines that an instruction to write information can be issued to a device as shown in FIG. 17. The determination function determines that the same write instruction cannot be issued when the device is printing. Therefore, a different determination rule can be set to each of the users 1 to 4 listed in user name 1730 in the present exemplary embodiment.

That is, the determination function can determine based on a different determination rule using the following determination information. When the device is in a lower power consumption state, the determination information defines a user who can issue an information obtaining request from a device (i.e., user 1 and user 2 in the example of FIG. 17), and a user who cannot issue an information obtaining request (i.e., user 3 and user 4 in the example of FIG. 17).

The rule application matrix 1700 describes whether a device control command can be issued to each of the above three items and the command is stored in a memory managed by the rule storage function 404. The rule application matrix 1700 is used in step S1608 in FIG. 16 to determine whether a device command control can be executed.

Fifth Exemplary Embodiment

The above exemplary embodiments describes a case where the rule storage function 404 registers an issue rule set in a memory inside the PC.

However, the issue rule can also be obtained from an apparatus such as a server with which the PC can communicate on a network. In this case, the command issue determination function 403 can refer to the issue rule.

Sixth Exemplary Embodiment

With reference to a memory map in FIG. 18, the configuration of software (e.g., programs) will be described below which can be read by an information processing apparatus according to an exemplary embodiment of the present invention. FIG. 18 illustrates the memory map of a storage medium storing the various software. Although not shown, information for managing software stored in the storage medium, e.g., version or creator, and information relying on an operating system of a computer which reads out programs (e.g., an icon for identifying the programs, etc.) can also be stored in the storage medium.

Furthermore, data ancillary to the various programs is managed in directories of the storage medium. In addition, programs for installing the various programs in computers or for decompressing compressed programs can also be stored in the storage medium.

The functions illustrated in FIG. 5, FIG. 10, FIG. 12, FIG. 14, and FIG. 16 can be implemented by a host computer executing a program installed from an outside source. A group of information including a program can be supplied to an information processing apparatus from a storage device such as a compact disk—read-only memory (CD-ROM), flash memory, or floppy disk, or from an external storage device through a network.

A storage medium which stores software (program code) for realizing the operations of the above-described exemplary embodiments can be supplied to a system or an apparatus. Operating the various devices according to the program stored in the computer (CPU or micro-processing unit (MPU)) of the system or the apparatus is also included in the scope of the present invention.

In the above case, the software (program code) itself which is read out from the recording medium, realizes the operations of the embodiments. The recording medium storing the program code constitutes the present invention. Such programs can take any form, for example, object code, a program executed by an interpreter, or script data supplied to an OS. The storage medium can be, for example, a flexible disk, hard disk, optical disk, magnetic optical disk, CD-ROM, magnetic tape, nonvolatile memory card, ROM, or digital versatile disk (DVD).

Such programs can also be supplied by the system or the apparatus accessing a web page on the Internet through the browser of a client computer. The program itself or a compressed file including an auto-install function can be downloaded from the web page onto a hard disk. In addition, the program code can be broken up into a plurality of files, and each file can be downloaded from different web pages. Namely, the present invention can be applied to WWW or ftp servers that allow numerous users to download the program files so that the functions or processes of the present invention can be realized on their computers.

Furthermore, such program code can be encrypted and stored in a storage medium such as a CD-ROM to be distributed to users. A user who meets the predetermined conditions can download the key information for decrypting the program from a web page through the Internet. By using the key information, the encrypted program can be executed and be installed in a computer to realize the functions of the present invention.

Furthermore, based on an instruction of the program, the operating system (OS) or other application software running on the computer may execute part or all of the processing so that the functions of the above-described embodiments can be realized.

Furthermore, the supplied program code can be stored in a memory equipped in a function enhancement board of the computer or a function enhancement unit connected to the computer, and a CPU in the function enhancement board or the function enhancement unit can executes all or part of the processing based on the instructions of the program code to realize the operations of the embodiments.

According to an exemplary embodiment of the present invention, in the case where an user issues a device control command to a device in a lower power consumption state, the issuing of the command can be controlled based on the priority of the issued device control command. As a result, a device will be prevented from shifting from a lower power consumption state to a normal state by issuing a device control command of low priority.

In addition, a device control command of high priority can be issued regardless of the power state of the device. Therefore, a necessary device control can be performed without fail.

Furthermore, since a network device management application solely determines whether a device control command can be issued, the present invention can be applied to a device without making changes to the device implementation.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-053344 filed Feb. 28, 2006, which is hereby incorporated by reference herein in its entirety.

What is claimed is:

1. An apparatus for communicating with a device connected to a network through a management application, the apparatus comprising:
    a processor; and
    a memory coupled to the processor and having instructions that, when executed by the processor, cause the processor to perform operations comprising:
    determining whether an issue instruction to operate the device is allowed to be issued to the device, based on a command issue rule, the command issue rule being different in each attribute of the instruction;
    issuing the issue instruction to the device in a case where the instruction to operate the device is allowed to be issued; and
    executing an operation to operate the device when the issue instruction is issued.

2. The apparatus according to claim 1, wherein the determining makes determination based on determination information defined by a user.

3. The apparatus according to claim 2, further comprising:
    defining priority level for the instruction; and
    defining a user authority level of the user,
    wherein the determination information includes a level value defined by the definings.

4. The apparatus according to claim 1, wherein the determining generates a display instruction to perform display on a display unit to indicate that an operation will be performed on the device in the case where the instruction is allowed to be issued.

5. The apparatus according to claim 1, wherein the determining unit determines that an instruction to write information is allowed to be issued to the device when the device is idling in a lower power consumption state, and the instruction to write information is not allowed to be issued to the device when the device is printing.

6. The apparatus according to claim 1, wherein, when the device is in a lower power consumption state, the determining makes determination using determination information that defines a user who is authorized to issue an information obtaining request from the device and a user who is not authorized to issue an information obtaining request.

7. A method in an apparatus for communicating with a device connected to a network through a network management application, the method comprising:
    determining whether an issue instruction to operate the device is allowed to be issued to the device, based on a command issue rule, the command issue rule being different in each attribute of the instruction;
    issuing the issue instruction to the device in a case where the instruction to operate the device is allowed to be issued; and
    executing an operation to operate the device when the issue instruction is issued.

8. The method according to claim 7, wherein the determining makes determination based on determination information defined by a user.

9. The method according to claim 8, further comprising:
    defining priority level for the instruction by a first defining unit; and
    defining a user authority level of the user by a second defining unit, wherein
    determination information includes a level value defined by the first and second defining units.

10. The method according to claim 7, further comprising performing display on a display unit to indicate that an operation will be performed on the device in a case where the instruction is allowed to be issued.

11. The method according to claim 7, further comprising determining that an instruction to write information is allowed to be issued to the device when the device is idling in a lower power consumption state, and the instruction to write information is not allowed to be issued to the device when the device is printing.

12. The method according to claim 7, further comprising determining whether the instruction can be issued when the device is in a low power consumption state, using determination information defining a user who is authorized to issue an information obtaining request from the device and a user who is not authorized to issue an information obtaining request.

13. A non-transitory computer-readable storage medium storing instructions which, when executed by an apparatus for communication with a device connected to a network, causes the apparatus to perform operations comprising:

determining whether an issue instruction to operate the device is allowed to be issued to the device, based on the command issue rule, the command issue rule being different in each attribute of the instruction;

issuing the issue instruction to the device if the instruction to operate the device is to be issued; and executing an operation to operate the device when the issue instruction is issued.

14. The non-transitory computer-readable storage medium according to claim 13, wherein the determining makes determination based on determination information defined by a user.

15. The non-transitory computer-readable storage medium according to claim 14, further comprising:

defining priority level for an instruction by a first defining unit; and defining a user authority level of the user by a second defining unit, wherein the determination information includes a level value defined by the first and second defining units.

16. The non-transitory computer-readable storage medium according to claim 13, further comprising performing display on a display unit to indicate that an operation will be performed on the device in a case where the instruction is allowed to be issued.

17. The non-transitory computer-readable storage medium according to claim 13, further comprising determining that an instruction to write information is allowed to be issued to the device when the device is idling in a lower power consumption state, and the instruction to write information is not allowed to be issued to the device when the device is printing.

18. The non-transitory computer-readable storage medium according to claim 13, further comprising determining whether the instruction can be issued when the device is in a low power consumption state, using determination information defining a user who is authorized to issue an information obtaining request from the device and a user who is not authorized to issue an information obtaining request.

* * * * *